(12) United States Patent
Lovell et al.

(10) Patent No.: US 7,598,323 B2
(45) Date of Patent: Oct. 6, 2009

(54) RESIN CROSS-LINKING

(75) Inventors: Peter A. Lovell, Appleton (GB); David J. Berrisford, Manchester (GB); Andrew Whiting, Nevilles Cross (GB)

(73) Assignee: The University of Manchester, Manchester (GB)

( * ) Notice: Subject to any disclaimer, the term of this patent is extended or adjusted under 35 U.S.C. 154(b) by 624 days.

(21) Appl. No.: 10/535,333

(22) PCT Filed: Nov. 27, 2003

(86) PCT No.: PCT/GB03/05240

§ 371 (c)(1),
(2), (4) Date: Aug. 9, 2005

(87) PCT Pub. No.: WO2004/048448

PCT Pub. Date: Jun. 10, 2004

(65) Prior Publication Data

US 2006/0009572 A1 Jan. 12, 2006

(30) Foreign Application Priority Data

Nov. 27, 2002 (GB) ................................ 0227608.7

(51) Int. Cl.
*C08C 19/20* (2006.01)
*C08F 8/36* (2006.01)
(52) U.S. Cl. ..................... 525/353; 525/343; 525/326.1
(58) Field of Classification Search ................. 525/353, 525/343, 326.1
See application file for complete search history.

(56) References Cited

U.S. PATENT DOCUMENTS 3,153,021 A * 10/1964 Tashlick et al. .......... 526/219.6
5,514,535 A * 5/1996 Hamilton et al. ............ 430/622

FOREIGN PATENT DOCUMENTS

DE         842 198         6/1952

OTHER PUBLICATIONS

Boinon et al, "Polyl'(chloro-2-ethyl)-4-phenyl!-1-ethylene): Synthese, caracterisations, degradation thermique et modifications chimiques", Makrmol. Chem. 190:241-253 (1989).
Zhu et al, "Stabilization of polystyrene by Friedel-Crafts chemistry: effect of position of alcohol and the catalyst", Polymer Degradation and Stability 66:213-220 (1999).
Jaeger et al, "Preparation and characterization of base-sensitive destructible surfactants", J. Org. Chem. 51:3956-3959 (1986).

* cited by examiner

*Primary Examiner*—Ling-Siu Choi
(74) *Attorney, Agent, or Firm*—Nixon & Vanderhye P.C.

(57) ABSTRACT

A method of effecting cross-linking of a resin comprises generating vinyl sulfonyl moieties in situ with the resin, said sulfonyl moieties then undergoing a reaction which effects cross-linking of the resin. The vinyl sulfonyl moieties may be generated as a result of a loss of a liquid carrier for the resin to be cross-linked. The cross-linking reaction may result from reaction of the vinyl sulfonyl moieties with nucleophilic groups in the resin composition. The resin may be a copolymer of a compound of formula (IV) with other olefinically unsaturated monomers.

33 Claims, No Drawings

RESIN CROSS-LINKING

This application is the U.S. national phase of international application PCT/GB2003/005240 filed 27 Nov. 2003 which designated the U.S. and claims benefit of GB 0227608.7, filed 27 Nov. 2002, the entire contents of each of which are hereby incorporated by reference.

The present invention relates to a method of cross-linking resins and also to a cross-linkable resin composition.

There is a general need for improved storage-stable resin compositions which incorporate a resin to be cross-linked and all agents required to initiate cross-linking at the time required. Such compositions avoid the need for admixing a resin and a cross-linking agent shortly before cross-linking is to be effected.

The need exists, for example, in the field of cross-linkable latexes which are useful for coating, e.g. in the form of emulsion paint, and also in the field of high solids coatings.

Environmental pressures have forced the coatings industry to seek alternatives to the conventional solvent-borne coating systems that are used, for example, as paints and adhesives. The pressures have led to growth in the development and use of high-solids and water-borne coating systems. However, in many cases, this has brought with it significant technical difficulties, one of which is the need to match the performance characteristics of solvent-borne coatings by crosslinking of the coatings. A very large number of different chemistries have been investigated for this purpose, including the use of functional monomers such as N-methylol acrylamide and its alkyl ethers, acrylamidobutyraldehyde dialkyl acetals, glycidyl (meth)acrylate, (meth)acrylic acid, hydroxyethyl methacrylate, hydroxypropyl methacrylate, aminoethyl methacrylate, 2-acetoacetoxyethyl (meth)acrylate, trichlorophenyl acrylate, vinyl and acryloxy silanes, methyl acrylamidoglycolate methyl ether, 1,1-dimethyl m-isopropenylbenzyl isocyanate, N-acryl-3,5 dimethyl pyrazole, 2-alkenyl-2oxazolines and 2-(1-aziridinyl)ethyl acrylate. However there still is no crosslinking system that satisfies all the desired criteria for water-borne coatings.

In its broadest (first) aspect, the invention provides a method of effecting cross-linking of a resin comprising generating vinyl sulfonyl moieties in situ with the resin, said vinyl sulfonyl moieties then undergoing a reaction which effects cross-linking of the resin.

As explained more fully below, the vinyl sulfonyl moieties may be generated as a result of loss of a liquid carrier (e.g. by evaporation) for the resin to be cross-linked.

The cross-linking of the resin may result from reaction of the vinyl sulfonyl moieties with nucleophilic groups in the resin composition.

According to a second aspect of the present invention there is provided a cross-linkable resin composition comprising
(i) a polymer to be cross-linked;
(ii) a liquid carrier for the polymer;
(iii) nucleophilic groups; and
(iv) vinyl sulfonyl precursor groups capable of generating vinyl sulfonyl moieties on loss of liquid carrier from the composition at least one of the groups (iii) and (iv) being attached to the polymer to be cross-linked whereby loss of the liquid carrier results in generation of a vinyl sulfonyl moiety to effect cross-linking of the polymer.

Thus, the resin compositions of the invention incorporate, in addition to the polymer to be cross-linked and the liquid carrier, both (iii) nucleophilic groups and (iv) vinyl sulfone precursor groups capable of generating vinyl sulfonyl moieties on loss of liquid carrier (particularly by evaporation) from the composition, at least one of these types of groups (iii) and (iv) being attached to the polymer backbone. The vinyl sulfonyl moieties generated may be of the formula (I)

(I)

(in which ⁓ represents a chemical bond to carbon or a heteroatom) or a substituted version thereof in which one, two to three of the hydrogen atoms bonded to the olefinic carbon atoms are replaced by appropriate substituents. If the sulfur atom is bonded to a heteroatom then the latter may be nitrogen. Thus, the vinyl sulfonyl group may be a vinyl sulfonamide.

The vinyl sulfonyl groups (I) are then capable of reacting with the nucleophilic groups, e.g. in a Michael-type reaction, resulting in the formation of a chemical bond between a carbon atom of the vinyl sulfonyl component (I) and a residue of the nucleophile as represented by the following equation

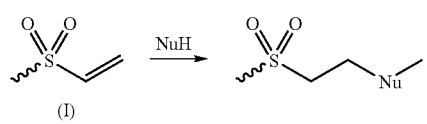

The composition of the invention is storage-stable and only becomes cross-linked when steps are taken to ensure loss of liquid carrier, e.g. by evaporation.

In the composition of the invention, it is preferred that both the nucleophilic groups (iii) and the vinyl sulfonyl precursor groups (iv) are attached to polymer chains to be cross-linked so that a nucleophilic group on one polymer chain may react with a vinyl sulfonyl moiety formed on another chain to provide cross-linking. We do not however preclude the possibility that, say, the vinyl sulfonyl precursor groups are bonded to the polymeric chains whereas the nucleophilic groups are provided on a cross-linking species having two or more such nucleophilic groups. Similarly we do not preclude the possibility that the nucleophilic groups are bonded to the polymer chains and the vinyl sulfonyl precursor groups are provided on a cross-linking species having two or more such groups.

Preferably the generation on the vinyl sulfonyl moiety results from loss of HX from the vinyl sulfonyl precursor groups, where X is a leaving group.

Preferably the vinyl sulfonyl precursor groups are of the formula (II)

(II)

where X is a leaving group, and $R^1$, $R^2$ and $R^3$ are independently selected from a hydrogen atom, a substituted or unsubstituted alkyl group, and a substituted or unsubstituted aryl group.

In the case of the groups of formula (II) there is, on loss of the liquid carrier for the polymer (e.g. by evaporation) a facile elimination of HX from the groups (II) leading to the production of a vinyl sulfonyl moiety (III) as depicted by the following equation:

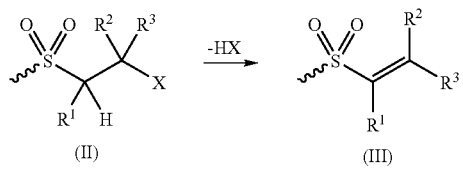

Where appropriate, it will generally be preferred that the liquid carrier for the resin is HX so that the above reaction is given to the left (resulting from excess of liquid carrier) so that the vinyl sulfonyl moieties are only generated on substantial loss of the liquid carrier HX.

For preference, $R^1$ (in formula II) is hydrogen. Optionally or additionally at least one (and preferably both) of $R^2$ and $R^3$ is/are hydrogen.

The leaving group X may be selected from groups of the formula $-OR^4$, $-OC(O)R^4$, $-NR_2^4$, $-SR^4$, $-NCOOR^4$ or $-OSO_3R^4$ where $R^4$ is hydrogen, a substituted or unsubstituted alkyl group, or a substituted or unsubstituted aryl group, or X is F, Cl or Br.

It is generally preferred that X is of the formula $-OR^4$. Preferably also $R^4$ is hydrogen although other $R^4$ groups which are particularly useful are Me and Et since the eliminated alcohols are of high volatility and low toxicity.

For various resin compositions in accordance with the invention it may be necessary to ensure that the pH of the composition allows the above reaction to proceed. Thus for example, is the case where X is —OH and HX (provided also as the liquid carrier) is $H_2O$, the pH of the composition should be acidic or alkaline rather than neutral.

For preferred embodiments of the invention in which the groups of formula (II) are attached to the polymer, they may be attached either directly to the polymer backbone or via a linker group which may for example be of an aliphatic or aromatic nature. The nature of the linker group may be selected having regard to the desired final properties of the cross-linked resin since these will be influenced by the nature of the linker group.

By way of example, a polymer incorporating groups of formula (II) bonded to the polymer chain by a linker incorporating an aromatic group may be prepared by co-polymerisation of a compound of formula (IV)

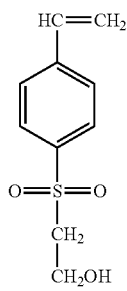

with other olefinically unsaturated monomers to produce the desired polymer.

Compound (IV) is 4-hydroxyethylsulfonyl styrene and is also referred to herein as HESS. Modifications of compound (IV) may also be used. For example the aromatic ring may have one or more substituents and/or the terminal —OH group may be replaced by any other —OR group defined above. Alternatively or additionally, the sulfone group may be ortho or meta position of the benzene ring.

Alternatively a compound of formula (V) may be used for providing the groups (I)

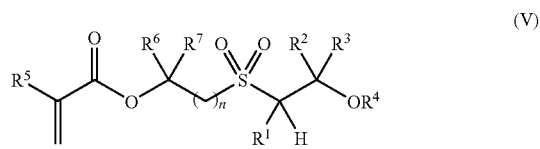

in which $R^1$-$R^4$ are as defined above, $R^5$, $R^6$ and $R^7$ are independently hydrogen or methyl, and n is a positive integer, most preferably at least 2 and ideally having a value of 2-6. As a modification of formula (V), the sulfone group may be bonded to the (meth)acrylate residue via a linker incorporating —($CH_2CH_2$—O)— groups.

The nucleophilic groups present in the composition, and provided for reaction with the vinyl sulfonyl groups, may for example be of the formula —OH, —SH, $NHR^8$ where $R^8$ is selected from the same groups as $R^4$ above. Alternatively, the nucleophic group may be provided by a species having a nucleophilic carbon atom, e.g. an acetoacetoxy group. In this latter case, the acetoacetoxy group may react in either a keto and enol form as depicted by the following equation:

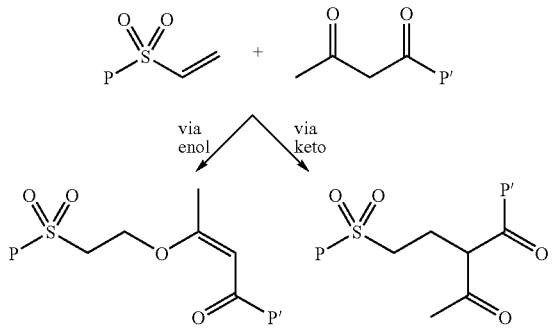

where P and $P^1$ represent different polymer chains.

For the preferred embodiment of the invention in which both the groups of formula (II) and the nucleophilic groups are bonded to the polymer chains, it is preferred that the resin to be cross-linked comprises 0.5% to 25%, more typically 1% to 10% (e.g. 3% to 7%) by mole of the groups of formula (II). The nucleophilic groups may be present in the resin to be cross-linked in an amount of 0.5% to 25% more preferably 1% to 10%, and usually 3% to 7% by mole.

Compositions in accordance with the invention may be in the form of solutions with the polymer to be cross-linked being dissolved in the carrier liquid therefor.

It is however particularly preferred that compositions in accordance with the invention are in the form of latexes in which the resin to be cross-linked (incorporating both the groups of formula II and the nucleophilic groups) is in the form of particles in a continuous aqueous phase which provides a reservoir of water effective to prevent loss of HX from the groups of formula (II) and thus their conversion to vinyl sulfonyl moieties. Thus, the groups of formula (II) remain unchanged during storage of the latex and all functional groups necessary for cross-linking can be incorporated uniformily throughout each latex particle without compromising latex shelf life.

Such latexes are useful for forming coatings on surfaces. On application of the latex to a surface, the loss of the water reservoir (by evaporation) results in generation of the vinyl sulfonyl group for cross-linking of the resin as described more fully above. The elimination of water to form vinyl sulfonyl groups will become more favourable as film formation proceeds, especially in the later stages of film formation. This is important because premature cross-linking would provide a barrier to film integration. Also, the water-sensitivity of the films will be reduced not only by the cross-links introduced but also by the reduction in hydrophilicity associated with the cross-linking chemistry.

Polymer latexes in accordance with the invention may be produced by copolymerising conventional monomers with (a) comonomers including groups of the formula (II) and (b) further comonomers including nucleophilic groups using conventional techniques of emulsion polymerisation, e.g. using monomer-starved conditions to ensure control and uniformity of copolymer composition.

Examples of conventional monomers which may be used include (meth)acrylic acid, itaconic acid, $C_{1-20}$ (e.g. $C_{1-8}$) alkyl esters of these acids, vinyl acetate, vinyl versatate, styrene, butadiene, and combinations of the aforesaid monomers. Specific examples of such monomers include vinyl acetate, butyl acrylate, 2-ethylexyl acetate and/or butyl methacrylate since copolymers comprising such monomer units are particularly suitable for water borne paint coatings.

The comonomers for incorporating groups of formula (II) may for example be compounds of formula (IV) and/or (V) as described above. These compounds are particularly suitable because they have the limited water solubility necessary for emulsion polymerisation.

Generally the total amount of the compound of formula (IV) and/or (V) incorporated in the final polymer will be in the range 0.5% to 25% by mole but more preferably 1% to 10%, e.g. 3% to 7% on the same basis.

Examples of comonomers capable of providing nucleophilic groups for cross-linking with the vinyl sulfonyl groups include hydroxyalkyl (meth)acrylates (e.g. hydroxyethyl acrylate, hydroxyethyl methacrylate, hydroxypropyl acrylate, hydroxypropyl methacrylate), 2-acetoacetoxyethyl acrylate and 2-acetoacetoxyethyl methacrylate.

The latex particles may for example have an average size in the range 50 nm-2 μm but more typically 100-500 nm. The particles may be of the core-shell type.

Generally, the latex will have a solids content of 20-80%, but more usually 40-60% by weight.

Latexes in accordance with the invention may for example be formulated with pigments and other conventional ingredients of coating materials.

Whilst the invention is particularly applicable to latexes, it may also be employed in the formulation of high solid coatings where the polymer content is above 80% of the coating formulation.

The compounds $R^1$-$R^3$=H and X=OH formula II (see above) for which X=H may be produced in accordance with the following reaction scheme (sequence VI→VII→VIII→IX).

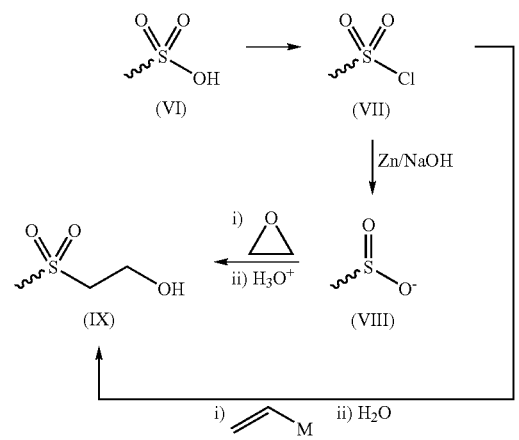

More particularly, the sulfonic acid (VI) is easily converted into the corresponding sulfonyl chloride under a variety of conditions (e.g. using thionyl chloride or phosphorus trichloride) which are then readily reduced to the sulfinate salt (VIII) under dissolving metal or sulfite reduction conditions. Sulfinate salts are good nucleophiles and react under mild conditions with ethylene oxide to provide the corresponding hydroxyethylsulfones.

An alternative direct route from (VII) to (IX) is the reaction of a vinyl organometallic compound directly with (VII) followed by hydration of the double bond.

To produce groups of formula (I) in which R is an alkyl group (e.g. methyl or ethyl), a modification of the above-described reaction scheme may be used in which an alkyl halide (e.g. methyl or ethyl iodide) may be reacted with (VIII) in place of $H_3O^+$.

To produce a compound of formula (V) in which n=1 and $R^4$=H the following reaction scheme may be used.

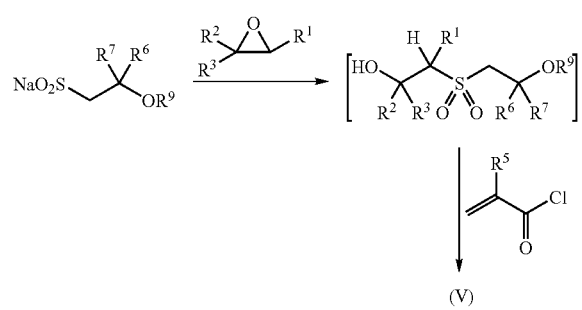

In the above scheme, $R^9$ may be methyl, ethyl or acetyl. Conveniently the scheme is used to produce compounds (V) in which $R^2$=H and $R^3$=methyl.

The invention will be illustrated with reference to the following non-limiting Examples.

EXAMPLE 1

Preparation of HESS

Preparation of p-Styrene Sodium Sulfonylchloride
p-Styrene sodium sulfinate (10.0 g) and phosphorous oxychloride (35.0 g) were placed in a 250 ml flask equipped with a magnetic stirrer bar, a condenser and a drying tube. The reaction mixture was refluxed at 105° C. After 1 hour the flask was cooled to room temperature and excess phosphorous oxychloride was distilled off. The product was extracted with diethyl ether, which was removed on a rotary evaporator.

A thick brown oil was obtained (7.64 G, 77%), the purity of which was proven by $^1$H and $^{13}$C NMR.

Preparation of p-Styrene Sodium Sulfinate p-Styrene sodium sulfonylchloride (12.5 g) was added dropwise to a 1000 ml flask equipped with a magnetic stirrer bar, which contained 150 ml of distilled water at 70° C. and zinc powder (10.0 g), with continuous stirring. After 20 minutes, 6 ml of 12.5M sodium hydroxide solution was added, raising the temperature of the mixture to 90° C. Finely powdered sodium carbonate was then added in portions until the mixture was strongly alkaline. The mixture was stirred for a further 10 minutes. The zinc was removed by filtration and the sulfinate salt was crystallised out of solution (7.20 g, 61%), the purity of which was proven by $^1$H, $^{13}$C NMR and mass spectrometry.

Reaction of p-Styrene Sodium Sulfinate with Ethylene Oxide p-Styrene sodium sulfinate (7.8 g) was dissolved in 25 ml of distilled water in a 150 ml flask equipped with a magnetic stirrer bar, to which 15 ml of acetone was added. The mixture was stirred for 10 minutes. The pH of the solution was brought to 7.5 with dilute hydrochloric acid. The flask contents were cooled to −10° C. with a dry ice/acetone bath. Ethylene oxide (1.25 g), diluted with 2.5 ml of diethyl ether (also similarly cooled) was transferred to the flask, which was then sealed. The reaction mixture was stirred at room temperature for 30 hours. The product was extracted with diethyl ether and dried with magnesium sulfate. The product was identified as HESS (3.72 g, 62%), the purity of which was proven by $^1$H, $^{13}$C NMR and mass spectrometry.

EXAMPLE 2

Latexes were prepared at 30% solids content by semicontinuous emulsion polymerisations involving two sequential stages, all polymerisation being carried out under a swept nitrogen atmosphere at 75° C. The first stage involved the formation of seed particles of 89-118 nm diameter. This was followed by a growth stage, which took the final diameter to 184-243 nm. The particles produced can be considered to be of the core-shell type in which the core is formed from the seed stage and the shell is formed in the growth stage. Two types of latex were prepared in this way:
  (i) poly[(n-butyl (meth)acrylate)] core and a poly[(n-butyl (meth)acrylate)-co-(hydroxypropyl (meth)acrylate)-co-styrene] shell. (Comparative).
  (ii) poly[(n-butyl (meth)acrylate)] core and a poly[(n-butyl (meth)acrylate)-co-(hydroxypropyl (meth)acrylate)-co-(4-hydroxyethylsulfone styrene)] shell. (Invention).

The formulations used for 500 ml scale preparations of latexes (i) (Comparative) are shown in Table 1 and those for latexes (ii) (Invention) are shown in Table 2, which gives the masses used. The relative proportions of the growth-stage reactant mixtures were changed in order to produce a range of latexes with different levels of functional monomers.

TABLE 1

| Formulation | Seed Stage | Growth Stage | | |
|---|---|---|---|---|
| Component | mass/grams | mass/grams | (mole %)* | |
| Butyl methacrylate | 12.5 | 81.6 (90) | 73.1 (80) | 62.9 (68) |
| Butyl Acrylate | — | — | — | 10.0 (12) |

TABLE 1-continued

| Formulation | Seed Stage | Growth Stage | | |
|---|---|---|---|---|
| Component | mass/grams | mass/grams | (mole %)* | |
| Hydroxypropyl methacrylate | — | 4.34 (5) | 9.27 (10) | 9.38 (10) |
| Styrene | — | 3.14 (5) | 6.69 (10) | 6.78 (10) |
| Aerosol MA | 0.19 | | 1.8 | |
| Deionised Water | 200 | | 37.5 | |
| Potassium Persulfate | 0.08 | | 0.12 | |

*The numbers in parentheses give the mol % of each monomer in the comonomer mixture.

TABLE 2

| Formulation | Seed Stage | Growth Stage | | |
|---|---|---|---|---|
| Component | mass/grams | mass/grams | (mole %)* | |
| Butyl methacrylate | 12.5 | 78.7 (90) | 67.8 (80) | 58.3 (68) |
| Butyl Acrylate | — | — | — | 9.27 (12) |
| Hydroxypropyl Acrylate | — | 4.20 (5) | 8.59 (10) | 8.69 (10) |
| HESS | — | 6.18 (5) | 12.66 (10) | 12.80 (10) |
| Aerosol MA | 0.19 | | 1.8 | |
| Deionised Water | 200 | | 37.5 | |
| Potassium Persulfate | 0.08 | | 0.12 | |

*The numbers in parentheses give the mol % of each monomer in the comonomer mixture.

To prepare the various latexes, the seed stage surfactant (Aerosol MA) and part of the deionised water (175 g) were added to a 700 ml flanged reaction vessel, equipped with a condenser nitrogen inlet and mechanical stirrer. A nitrogen atmosphere was established whilst the surfactant solution attained the reaction temperature of 75° C.

The seed stage monomer was added and after the reaction temperature had again stabilised, a solution of potassium persulfate (0.08 g) in de-ionised water (25 g) was added, thus marking the start of the reaction.

60 Minutes was allowed for completion of the seed stage, before addition of the growth stage reactant mixture was started at approximately 1.35 g min$^{-1}$ using a peristaltic pump (Watson-Marlow 505S Model). Solutions containing potassium persulfate (0.04 g) in de-ionised water (12.5 g) were added at 80, 100 and 130 minutes. Following completion of the addition of the second stage reactant mixture, 60 minutes was allowed before cooling the latex to room temperature and filtering through a 53 μm sieve.

Samples were taken at regular intervals during the course of each latex preparation in order to determine overall and instantaneous monomer conversions (done by gravimetric analysis) and z-average particle diameter using a Brookhaven photon correlation spectrometer.

The latexes thus obtained were designated 1-6 as shown in Table 3 which, for each such designation, shows the monomer content of the "shell" layer in moles and the solid content of the latex. Latexes 2, 4 and 6 illustrate the invention (Iv) whereas latexes 1, 3 and 5 are comparative (Co).

TABLE 3

| Formulation Component | Latex | | | | | |
|---|---|---|---|---|---|---|
| | 1 (Co) | 2 (Iv) | 3 (Co) | 4 (Iv) | 5 (Co) | 6 (Iv) |
| Butyl Acrylate | — | — | — | — | 12 | 12 |
| Butyl methacrylate | 90 | 90 | 80 | 80 | 68 | 68 |
| Styrene | 5 | — | 10 | — | 10 | — |
| Hydroxypropyl methacrylate | 5 | 5 | 10 | 10 | 10 | 10 |
| 4-(2-hydroxy-ethylsulphonyl)-styrene (HESS) | — | 5 | — | 10 | — | 10 |
| Solid (%) | 30 | 30 | 30 | 30 | 30 | 30 |

Gel Fraction (i) Films (~2 mm thickness) were formed from latexes 1 to 6. After defined intervals (2 weeks, 1 month and 3 months) known weights of the films were extracted at room temperature with butanone to determine the gel fraction of the films. The gel fraction in the latexes was determined through coagulation of a known quantity of the latex by freeze-thaw cycling, followed by extraction of the coagulum with butanone at room temperature. The percentage gel fraction was determined by the following equation:

gel %=(mass of the gel/total mass of the polymer)×100

(ii) The gel fractions of the latex "as prepared" and also after storage for 3 months were determined by the same freeze-thaw and extraction procedure as defined under (i).

(iii) Films (~2 mm thickness) were prepared from latex 6 (pH=2.4) and also for further latexes obtained therefrom by adjusting the pH to (a) 5.5-6.2, (b) 7.0 to 7.8, and (c) 8.5 to 9.0. The gel fraction of the films was determined 1 week after formation using the procedure described in (i).

The results of the gel fraction tests are shown in Table 4.

reaction proceeds at a wide range of latex pHs except in the range 7.0 to 7.8. This demonstrates that, for this particular cross-linking system, acidic or alkaline (rather then neutral) pH is required to effect cross-linking.

Glass Transition Temperature ($T_g$)

Latexes 1-6 were tested to find their glass transition temperature ($T_g$). All of the latexes were found to have $T_g$ values in the range 23 to 36° C. thus indicating that the latexes are film forming.

Tensile Testing

Films from latexes 5 and 6 were subjected to tensile testing on an Instron 4301 tensile testing machine to determine their mechanical properties. The test was carried out on dumbbell specimens 4.2 mm×1.8 mm cross-section with a gauge length of 40 mm using a crosshead speed of 20 mm min$^{-1}$. The results of the test are shown in Table 5.

TABLE 5

| Latex | E/MPa | $\epsilon_y$/% | $\sigma_y$/MPa | $\epsilon_u$/% | $\sigma_u$/MPa |
|---|---|---|---|---|---|
| 5(Co) | 188 | 10.9 | 4.35 | 280 | 7.2 |
| 6(Iv) | 336 | 7.1 | 8.14 | 210 | 7.5 |

Where E = tensile modulus
$\epsilon_y$ = yield strain
$\sigma_y$ = yield stress
$\epsilon_u$ = ultimate tensile strain
$\sigma_u$ = ultimate tensile stress Thus latex 6(Iv) prepared according to the invention gave films with a higher modulus and yield stress but lower ultimate elongation than the comparative latex 5(Co) consistent with the presence of cross-links in the films from latex 6 (Iv).

The invention claimed is:

1. A method of effecting cross-linking of a resin comprising generating vinyl sulfonyl moieties in situ with the resin,

TABLE 4

| | (i) Gel Fractions - "Aged Films" | | | (ii) Gel Fractions -Latexes | | (iii) Gel Fractions of films after 1 week Effect of latex pH | | | |
|---|---|---|---|---|---|---|---|---|---|
| | | | | | | pH = 2.4 | | | |
| Latex No | 2 Weeks | 1 Month | 3 Months | (as prepared) | 3 months | (as prepared) | pH = 5.5-6.2 | pH = 7.0-7.8 | pH = 8.5-9.0 |
| 1(Co) | 1-2 | 0 | 0 | 0 | 0 | — | — | — | — |
| 2 (Iv) | 10 | 25 | 28 | 0 | 0 | — | — | — | — |
| 3(Co) | 6-8 | 0 | 0 | 0 | 0 | — | — | — | — |
| 4(Iv) | 20 | 35 | 43 | 0 | 0 | — | — | — | — |
| 5(Co) | 1-3 | <1 | 0 | 0 | 0 | — | — | — | — |
| 6(Iv) | 72-75 | 77-82 | 80-82 | 0 | 0 | 72-80 | 76-78 | 0 | 70-78 |

The gel % data for films formed from the latexes show that crosslinking only occurs for the latex copolymers prepared using HESS and that the level of crosslinking in the films increases with time. The comparison latexes prepared using styrene in place of HESS give films that do not crosslink, even after long periods. This shows that the repeat units derived from HESS are responsible for the crosslinking.

The shelf-life of a latex is an important factor for commercial applications. The gel % data for all the latexes is zero, even 3 months after preparation. This shows that crosslinking does not take place during storage of the latex, confirming that the HESS repeat units do not generate the vinyl sulfone groups whilst in the latex form due to the excess of water present.

A series of films were formed from samples of latex 6(Iv) that were pH-adjusted just prior to coating. The gel % results for the films one week after coating show that the crosslinking said vinyl sulfonyl moieties then undergoing a reaction which effects cross-linking of the resin, wherein the vinyl sulfonyl moieties are generated as a result of loss of a liquid carrier for the resin to be cross-linked.

2. A method as claimed in claim 1 wherein evaporation of the liquid carrier causes generation of the vinyl sulfonyl moieties.

3. A method as claimed in claim 1 wherein cross-linking results from reaction of the vinyl sulfonyl moieties with nucleophilic groups in the resin composition.

4. A cross-linkable resin composition comprising
    (i) a polymer to be cross-linked;
    (ii) a liquid carrier for the polymer;
    (iii) nucleophilic groups; and (iv) vinyl sulfonyl precursor groups capable of generating vinyl sulfonyl groups on loss of liquid carrier from the composition at least one of the groups (iii) and (iv) being attached to the polymer to be cross-linked whereby loss of the liquid carrier results in generation of a vinyl sulfonyl moiety to effect cross-linking of the polymer, wherein the vinyl sulfonyl precursor groups are of the formula (II)

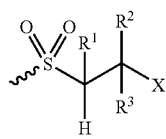

(II)

where X is a leaving group, generation of the vinyl sulfonyl moiety results from loss of HX from the vinyl sulfonyl precursor groups, $R^1$, $R^2$ and $R^3$ are hydrogen atoms, and ∼∼∼ can be a chemical bond to carbon or heteroatom functionality.

5. A composition as claimed in claim 4 wherein the leaving group X is selected from groups of the formula —$OR^4$, —OC(O)$R^4$, —$NR_2^4$, —$SR^4$, —$NCOOR_4$ or —$OSO_3R^4$ where $R^4$ is hydrogen, a substituted or unsubstituted alkyl group, or a substituted or unsubstituted aryl group, or X is F, Cl or Br.

6. A composition as claimed in claim 5 wherein X is of the formula —$OR^4$.

7. A compositions as claimed in claim 6 wherein $R^4$ is hydrogen.

8. A composition as claimed in claim 6 wherein $R^4$ is methyl or ethyl.

9. A composition as claimed in claim 4 wherein the liquid carrier for the polymer to be cross-linked has the formula HX.

10. A composition as claimed in claim 4 wherein the vinyl sulfonyl precursor groups are attached to the polymer chains to be cross-linked.

11. A composition as claimed in claim 10 wherein the polymer to be cross-linked comprises 0.5 to 25% by mole of the vinyl sulfonyl precursor groups.

12. A composition as claimed in claim 11 wherein the polymer to be cross-linked comprises 1 to 10% by mole of vinyl sulfonyl precursor groups.

13. A composition as claimed in claim 12 wherein the polymer to be cross-linked comprises 3 to 7% by mole of vinyl sulfonyl precursor groups.

14. A composition as claimed in claim 10 wherein the polymer incorporating the vinyl sulfonyl precursor groups is a co-polymer of a compound of formula (IV)

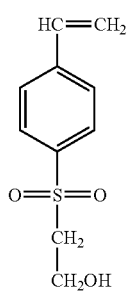

(IV)

with other olefinically unsaturated monomers.

15. A composition as claimed in claim 10 wherein the polymer incorporating the vinyl sulfonyl precursor groups is a co-polymer of a compound of formula (V)

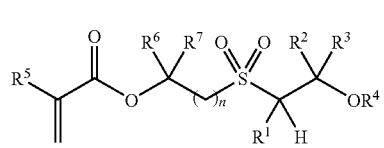

(V)

in which $R^1$-$R^3$ are as defined in claim 7, $R^4$ is as defined in claim 11, $R^5$, $R^6$ and $R^7$ are independently hydrogen or methyl, and n is a positive integer.

16. A composition as claimed in claim 15 where $R^4$ is hydrogen, methyl or ethyl.

17. A composition as claimed in claim 4 wherein the nucleophilic groups are selected from —OH, —SH and —$NHR^8$ where $R^8$ is hydrogen, substituted or unsubatituted alkyl (preferably $C_{1-4}$ alkyl), or a substituted or unsubstituted aryl, group.

18. A composition as claimed in claim 4 wherein the nucleophilic groups are acetoacetoxy groups.

19. A composition as claimed in claim 4 wherein the nucleophilic groups are attached to polymer chains to be cross-linked.

20. A composition as claimed in claim 19 wherein the polymer to be cross-linked comprises 0.5 to 25% by mole of the nucleophilic groups.

21. A composition as claimed in claim 20 wherein the polymer to be cross-linked comprises 1 to 10% by mole of the nucleophitic groups.

22. A composition as claimed in claim 13 wherein the polymer to be cross-linked comprises 3 to 7% by mote of the nucleophilic groups.

23. A composition as claimed in claim 4 wherein the polymer to be cross-linked is dissolved in the liquid carrier.

24. A composition as claimed in claim 4 in the form of a latex comprising a continuous aqueous phase end a discontinuous particulate phase of the polymer to be cross-linked, said polymer having attached thereto said vinyl sulfonyl precursor groups and said nucleophilic groups.

25. A composition as claimed in claim 24 wherein the polymer to be cross-linked has been obtained by copolymerisation of comonomers including vinyl sulfonyl precursor groups, comonomers including nucleophilic groups and optionally additional monomers.

26. A composition as claimed in claim 25 wherein the polymer incorporates said additional monomers which are selected from (meth)acrylic acid, itaconic acid, $C_{1-20}$ (e.g. $C_{1-8}$) alkyl esters of these acids, vinyl acetate, vinyl versatates, styrene, butadiene, and combinations of the aforesaid monomers.

27. A composition as claimed in claim 26 wherein the additional monomer is selected from vinyl acetate, butyl acrylete, 2-ethylexyl acrylate and butyl methacrylate.

28. A latex comprising a continuous liquid phase and a discontinuous phase of a film-forming polymer incorporating
(iii) nucleophilic groups; and
(iv) groups of the formula (I)

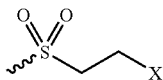
(I)

where X is a leaving groups and ⌇⌇ represents a chemical bond to a carbon or heteroatom, whereby loss of liquid results in generation of a vinyl sulfonyl moiety by loss of HX on the groups of formula (I) and cross-linking of the polymer by reaction of this vinyl sulfonyl and the nucleophilic groups.

29. A latex as claimed in claim 28 wherein the polymer comprises 1 to 10% by mole of the groups of formula (I) and 1 to 10% by mole of the nucleophilic groups.

30. A latex as claimed in claim 28 wherein the polymer has been obtained by emulsion polymerisation of
(A) a compound of formula (IV)

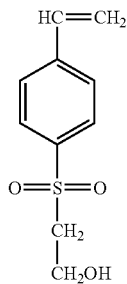
(IV)

(B) a hydroxyalkyl (meth)acrylate (e.g. hydroxyethyl acrylate, hydroxyethyl methecrylate, hydroxypropyl acrylate, hydroxypropyl methacrylate), 2-acetoacetoxyethyl acrylate or 2-acetoacetoxyethyl methacrylate; and
(C) at least one additional monomer.

31. A method of effecting cross-linking of a resin comprising generating vinyl sulfonyl moleties in situ with the resin, said vinyl sulfonyl moleties then undergoing a reaction which effects cross-linking of the resin wherein cross-linking results from reaction of the vinyl sulfonyl moleties with nucelophilic groups in the resin composition.

32. A cross-linkable latex resin composition comprising a polymer to be cross-linked in the form of particles in a continuous aqueous phase as liquid earner for the polymer particles, said polymer incorporating nucleophilic groups attached to the polymer chain and further incorporating vinyl sulfonyl precursor groups attached to the polymer chain, said vinyl sulfonyl precursor groups being of the formula (IIa)

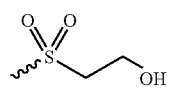
(IIa)

wherein loss of carrier water results in generation of vinyl sulfonyl moieties to effect cross-linking of the polymer.

33. A composition as claimed in claim 32 wherein the polymer is a co-polymer of a compound of formula (IV)

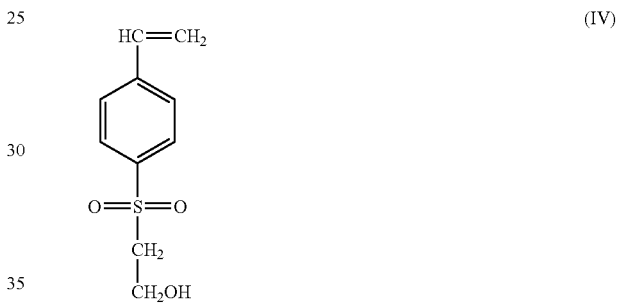
(IV)

with other olefinically unsaturated monomers.

* * * * *